US007926409B2

(12) United States Patent
Arbter et al.

(10) Patent No.: US 7,926,409 B2
(45) Date of Patent: Apr. 19, 2011

(54) VALVE CLUSTER

(75) Inventors: Jurgen Arbter, Waiblingen (DE);
Gerhard Nolle, Plochingen (DE);
Thomas Kintzel, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 672 days.

(21) Appl. No.: 12/036,761

(22) Filed: Feb. 25, 2008

(65) Prior Publication Data
US 2008/0236683 A1 Oct. 2, 2008

(30) Foreign Application Priority Data

Mar. 29, 2007 (EP) .................................... 07400007

(51) Int. Cl.
*F15B 13/044* (2006.01)
(52) U.S. Cl. ...................................................... 91/459
(58) Field of Classification Search .................. 91/1, 459
See application file for complete search history.

(56) References Cited

U.S. PATENT DOCUMENTS

| 4,124,887 A | 11/1978 | Johnson et al. |
| 5,458,048 A | 10/1995 | Hohner |
| 5,823,088 A * | 10/1998 | Frisch ............................. 91/459 |
| 6,973,867 B2 * | 12/2005 | Frisch et al. .................... 91/459 |
| 7,607,380 B2 * | 10/2009 | Hiramatsu et al. .................. 91/1 |
| 2004/0011194 A1 * | 1/2004 | Lederer et al. .................. 92/5 R |

FOREIGN PATENT DOCUMENTS

| EP | 1586780 A1 | 10/2005 |
| WO | WO9404831 A1 | 3/1994 |

OTHER PUBLICATIONS

European Search Report of European Patent Application No. 07 400 007.6, Aug. 22, 2007.

* cited by examiner

*Primary Examiner* — Michael Leslie
(74) *Attorney, Agent, or Firm* — Hoffmann & Baron, LLP

(57) ABSTRACT

A valve cluster comprises several valve modules arranged in row direction adjacent to each other for the fluid power control of fluid power device, and at least one fluid power device coupled with and controlled by the valve cluster, such device constituting a unit separate from the valve cluster. The valve cluster comprises a receiving means which is assigned to the fluid power device and is designed for receiving device identification data characterizing the at least one fluid power device, said device identification data being transmitted by an ident data transmission means assigned to the fluid power device, the receiving means being, for passing on the device identification data, connected or being able to be connected with a control means for the control of the fluid power device.

17 Claims, 2 Drawing Sheets

VALVE CLUSTER

CROSS-REFERENCE TO RELATED APPLICATION

This application claims priority based on European Patent Application No. 07 400 007.6 filed on Mar. 29, 2007, which is incorporated herein by reference.

BACKGROUND OF THE INVENTION

Field of the Invention

The invention relates to a valve cluster comprising a plurality of valve modules arranged in a row direction adjacent to each other for the fluid power control of fluid power devices and at least one fluid power device connected with the valve cluster and controlled by the valve cluster, said fluid power device constituting a unit separate from the valve cluster.

The said fluid power device may for example be a pneumatic drive cylinder, which is controlled by the valve cluster. The configuration of an automation system, as for example the valve cluster, is however a complex and onerous task. Thus for example operating parameters of the fluid power device must be saved for control or regulation of the valve cluster or a master control device thereof. In the case of the operating data or identification data it is a question for example of the displacement travel of the pneumatic drive, the diameter of its piston or the like.

SUMMARY OF THE INVENTION

One object of the invention is accordingly to provide a valve cluster which is simple to configure and parameterize.

In order to achieve these and/or other objects appearing from the present specification, claims and drawings, in the invention a valve cluster of the type initially mentioned comprises a receiving means which is assigned to the fluid power device and is designed for receiving device identification data characterizing the at least one fluid power device, said device identification data being transmitted by an ident data transmission means assigned to the fluid power device, the receiving means being, for passing on the device identification data, connected or being able to be connected with a control means for the control of the fluid power device.

One basic principle of the invention is that the valve cluster with the receiving means—it may be a question of several receiving means—receives device identification data so that separate input of such data, for example to a parameterizing interface of the valve cluster, is not necessary. The fluid power device may for example be a valve, a pneumatic power cylinder, a hybrid drive (electrical or fluid power and more particularly pneumatic), a vacuum means or, respectively, a vacuum materials handling means such as a suction means, a hydraulic drive or the like. The device specific data, as for example the respective working stroke, permissible pressures or the like, are received by the valve cluster at the receiving means and are then available for further usage.

The device identification data may for example be for the type of the device, a serial number of the device, physical dimensions such a length, working surface of an actuator member or piston, pressure values, and in particular the maximum pressure and rated operating pressures, output force values, output force values as related to the set pressures, a working stroke or the like. Furthermore kinematic data for the fluid power device, such as for example speed values, for example a maximum speed or a rated operational speed, the braking travel or the like may represent device identification data.

The control means may for example constitute a component of the valve cluster or a master control means. Preferably the respective control means will include a regulator for regulation of the fluid power device or may itself constitute such a regulator.

In accordance with one advantageous modular concept the control means constitutes a regulation module or a control module able to be lined up with the valve module. It is possible that the control means is part of a stacked arrangement.

The receiving means may be provided at various different positions on the valve cluster. For instance it may be a component of a control means, or it may be provided on an input or output module for the analog or, advantageously, the digital input output of data. Furthermore the receiving means can be arranged on a valve cluster communication means, for example on a field bus coupling module. The receiving means may also constitute a component of a regulator communication interface for the regulation of the at least one fluid power device. The regulator communication interface is preferably provided on a regulation module of the valve cluster.

The receiving means is preferably connected with a valve cluster communication means, as for example with a communication module, for an external communication of the valve cluster. By way of the valve cluster communication means it is possible for the device identification data received at the receiving means in accordance with the invention to be passed on to further components of a automation system, as for example a parameterizing tool, to a master control or to a diagnostic device or the like.

For internal communication within the valve cluster it is preferred for an internal communication bus to be provided. The modules of the valve cluster, that is to say in particular such modules as well, which have a receiving means for device identification data, are connected with this communication bus The receiving means for the device identification data may include a wired or a wireless interface. Installation is simpler in the case of a wireless interface. A wireless interface is for example a radio interface or an optical interface.

It is an advantage if the receiving means includes a bus interface. Then it is readily possible to produce an appropriate configuration, in which the receiving means is designed for a concatenated coupling arrangement. In the case of this coupling arrangement a first ident data transmission means of a first fluid power device and at least one second ident data transmission means of a second fluid power device is connected with the receiving means serially. The ident data transmission means are for example connected in series or in parallel with the bus. Furthermore a cascaded arrangement, in which one ident data transmission means sweeps or receives and passes on the device identification data of the other ident data transmission means, is an advantage.

The ident data transmission means may be in many different ways. For instance they can constitute a component of the fluid power device. Thus an ident data transmission means may for example be a component of a pneumatic cylinder, of a pneumatic valve or the like. However a modular, separate concept of the structure is also advantageous, in which the ident data transmission means constitutes a unit separate from the respective fluid power device. For instance it may in this case be a question of an indent module, which includes a conductor connection placed between the fluid power device and the receiving means on the side of the valve cluster. However a sensor means, which is assigned to the fluid power device, may transmit the device identification data to the valve cluster. Although the sensor device may also be a component of the fluid power device, it is however advantageous to have a modular concept, in which the receiving means constitutes a unit divorced from the fluid power device. Via its sensor communication interface the sensor device transmits the device identification data to the valve cluster. The device identification data may in this case be saved in the sensor device and/or in the fluid power device. The sensor device will then read the device identification data save in the fluid power device and will transmit same by way of its sensor communication interface to the valve cluster.

The fluid power device may be a valve means remote from the valve cluster, as for example a servo valve, which control a fluid power actuator. The actuator is for example a pneumatic positioning drive. In the case of this arrangement it is an advantage if the fluid power actuator or a sensor device associated with the actuator, which for example comprises a sensor module arranged on the actuator, serially communicates actuator communication data by way of the valve means remote from the valve cluster to said cluster. In the case of this configuration as well it is possible for an ident module to be placed in circuit between the valve means and the fluid power actuator, such ident module transmitting the actuator identification data to the valve means and via same farther on to the valve cluster.

Admittedly it is possible for the receiving means to possess separate data lines, as for example bus lines, by way of which the ident data transmission means is connected with the valve cluster. A simplified installation is possible if the receiving means is coupled with the ident data transmission means of the fluid power device via a fluid connecting line, which in addition to a fluid duct additionally comprises at least one data line for the transmission of device identification data. The data line may for example be an optical or and electrical line. The data line may for example be arranged in a casing for the fluid duct.

Further advantageous developments and convenient forms of the invention will be understood from the following detailed descriptive disclosure of embodiments thereof in conjunction with the accompanying drawings.

DETAILED DESCRIPTION OF THE PREFERRED EMBODIMENTS

Figure 1:
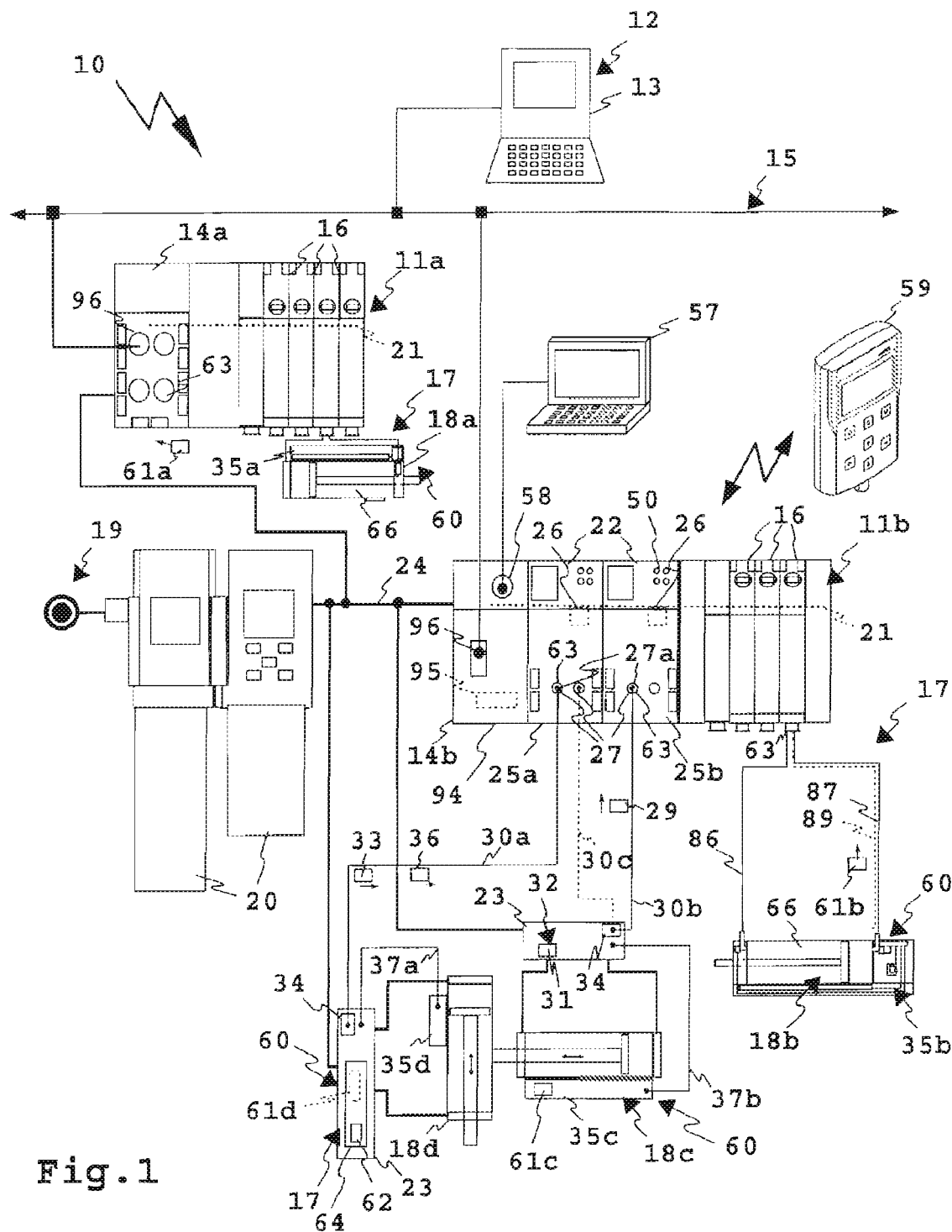
FIG. 1 diagrammatically shows an automation system with two valve clusters and a central routing controller.
Figure 2:
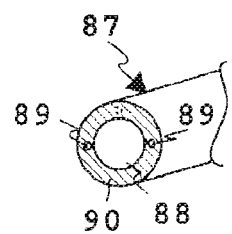
FIG. 2 shows a fluid line with integrated electrical conductors for the connection of an actuator in a valve cluster in accordance with FIG. 1.
Figure 3:
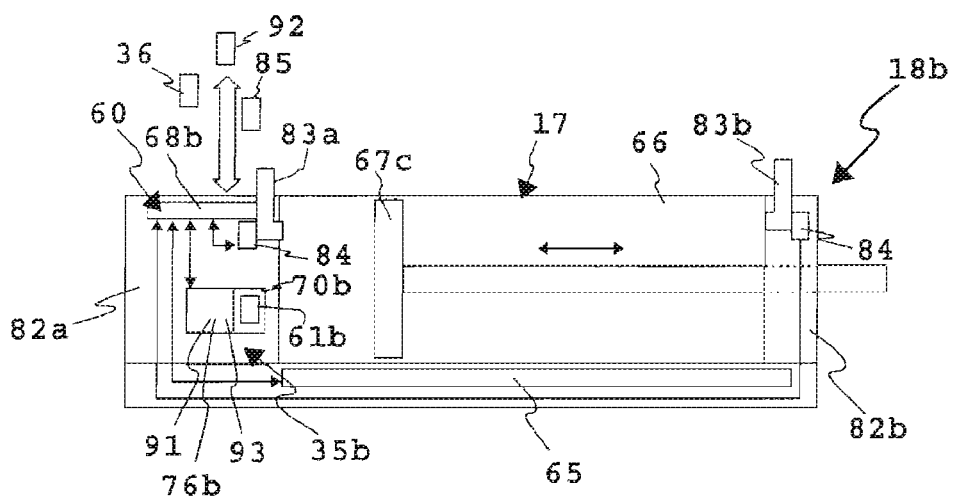
FIG. 3 shows diagrammatic side elevation of a fluid power actuator with a sensor device which transmits device identification data characterizing the actuator by way of a sensor communication means.
Figure 4:
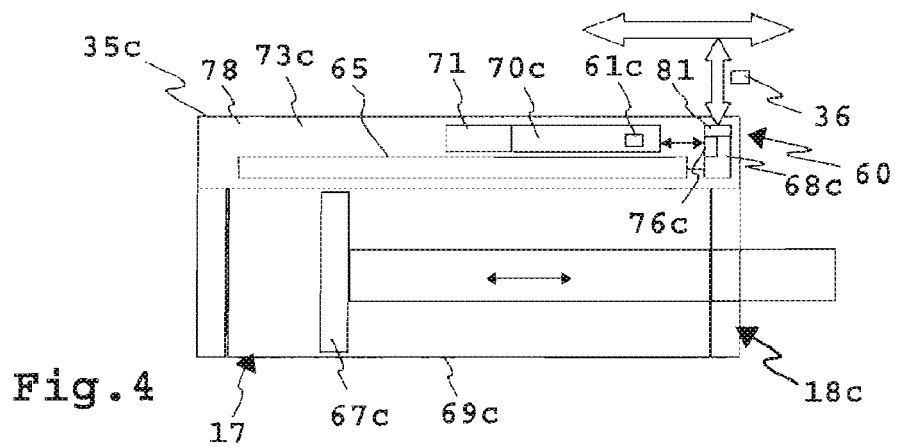
FIG. 4 shows an actuator with a sensor device installed on it, the sensor device being a separate unit, such sensor device also transmitting device identification data of the actuator by way of a sensor communication interface.
Figure 5:
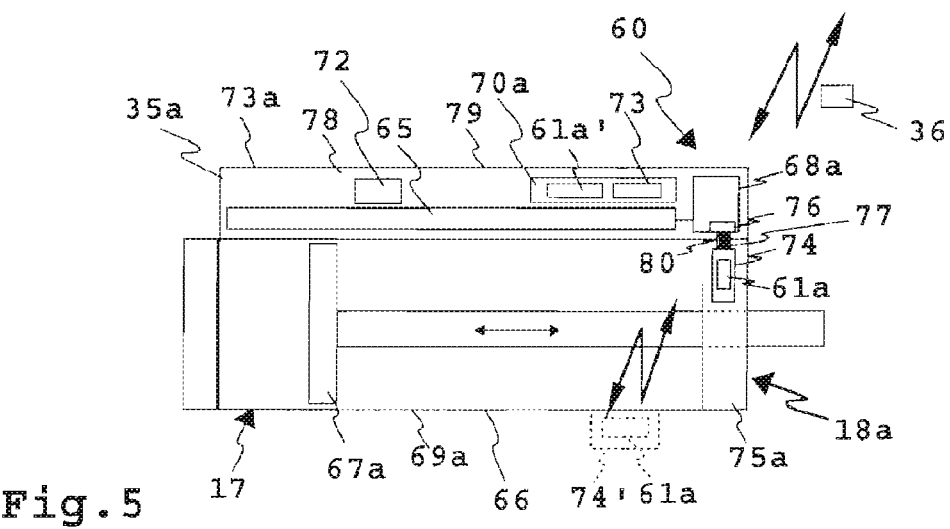
FIG. 5 shows an actuator with a memory for device identification data characterizing the actuator, such data being employed by a sensor device, installed on the actuator as a separate unit, for transmission using the sensor communication interface thereof.

In the description of the working embodiments of the invention partially similar or functionally equivalent components are provided with the same reference numerals and are only described once over.

In the case of an automation system 10 valve clusters 11a and 11b are controlled by a master, central control means 12, as for example a routing computer 13. The valve clusters 11a and 11b are connected with valve cluster communication means 14a and 14b for external communication with a system bus 15, as for example a field bus, by way of external interfaces 96, for example bus interfaces. The control means 12 controls the valve clusters 11a and 11b by way of the system bus 15, which may be wired or wireless.

The valve clusters 11a and 11b comprise valve modules 16 lined up with the communication means 14a and 14b. The valve modules 16 serve for fluid power control of fluid power devices 17, as for instance pneumatic actuators 18a and 18b. The actuators 18a and 18b are pneumatic power cylinders 66, which are illustrated by way of example as power cylinders with piston rods, although designs or modifications would be possible without piston rods and having an additional electrical drive part. The regulation modules 25a and 25b are also designed for the regulation of electrical or hybrid fluid power and electrical drives. Thus for example instead of the pneumatic actuator 18d an electrical drive may be provided.

The valve clusters 11a and 11b are run on compressed air, for example from a compressed air source 19. The compressed air source 19 supplies servicing devices 20 for instance such as filters or oilers, which condition compressed air for the valve clusters 11a and 11b. The servicing device 20 are in the present case separate from the valve clusters 11a and 11b, although they could however also be components of the valve cluster 11b.

The valve modules 16 receive control instructions from the central control means 12 for the pneumatic control of the actuators 18a and 18b by way of the system bus 15. The communication means 14a and 14b transmit the control instructions so received by way of the internal communication buses 21 to the valve modules 15. The communication buses 21 serve for internal communication of the valve clusters 11a and 11b.

Whereas the valve cluster 11a is exclusively externally controlled by way the system bus 15, the valve cluster 11b has local control competence in the form of control means 22. The control means 22 are in the form of control modules, which are placed in circuit between the valve modules 16 and the communication means 14b designed in the form of a communication module.

Optionally the valve cluster 11b may include a local control means 94 for its control, f. i. of the valve modules 16, f. i. a separate control module. Furthermore the communication means 14b can be in the form of a local control means 94 for the valve cluster 11b. For this purpose the communication means 14b may for example comprise a processor 95, which by way of the communication bus 21 sends control instructions, for example to the valve modules 16.

The control means 22 control valve means 23, which for their part drive actuators 18c and 18d. The actuators 18c and 18d for example constitute servo drives.

Admittedly the actuators 18c and 18d could be independent drives. However in the present case they are mechanically coupled together. In the drawing this is diagrammatically indicated because the actuator 18d is arranged on the force output part of the actuator 18c, for example on its piston rod. A mechanical coupling may however also be indirectly provided for, for example if the actuators 18c and 18d constitute the drives of gantry or a carriage able to travel in the X and Y directions.

The valve means 23 are valves separate from the valve cluster 11b, which are connected with a compressed air line distributing system 24 supplied from the compressed air source 19. The valve means 23 control the supply of compressed air to the actuators 18*c* and 18*d*, which are for example pneumatic drive cylinders. The valve means 23 and the actuators 18*c* and 18*d* are also fluid power devices 17.

The control means 22 regulate the actuators 18*c* and 18*d* by a control of the valve means 23 in a regulation mode. The control means 22 are for example regulation modules 25*a* and 25*b*. The regulation modules 25*a* and 25*b* satisfactorily fit into the modular concept of the valve cluster 11*b*. They are able to be lined up with valve modules 16 and also the communication means 14*b*.

The regulation modules 25*a* and 25*b* are coupled with internal bus interfaces 26 on the internal communication bus 21 of the valve cluster 11*b*. The regulation modules 25*a* and 25*b* may receive messages by way of the communication bus 21, as for example control instructions from the control means 12 and may also transmit messages, for example indications, which are passed by the communication means 14*b* to the control means.

For their regulation tasks the regulation modules 25*a* and 25*b* have separate regulator communication interfaces 27 for the output of setting values 28 and the reception of actual values 29. The communication interfaces 27 are real time interfaces. The communication interfaces 27 comprise digital bus interfaces 27*a*. The valve means 23 are coupled by way of bus lines 30*a* and 30*b* with the communication interfaces 27 so that each fluid power component group to the regulated, consisting of a valve means 23 and one actuators 18*c* and 18*d*, has a separate regulator bus line 30*a* or 30*b* for it. This means that a rapid communication is possible between the component groups to be regulated and the assigned regulation module 25*a* and 25*b*. Between each regulation module 25*a* and 25*b* and its arrangement 23, 18*c* or 23 18*d* to the regulated there is a separate physical connection. The actual values 29 are also transmitted by way of these connections.

As an alternative the regulation module 25*a* could be a regulator for two actuators and by way of a bus line 30*a* and an optional bus line 30*c*, which instead of the bus line 30*b* leads to the regulation module 25*a*, could regulate both arrangements 23, 18*c* or 23, 18*d*.

The actual values 29 for example include pressure sensor values 33, which are generated by pressure sensors 31 of a sensor arrangement 32 of the valve means 23. The pressure sensors 31 are for example placed at the connections for compressed air lines, by which the actuators 18*c* and 18*d* are connected with the valve means 23. To this extent the valve means 23 constitute sensor devices. The valve means 23 transmit the pressure sensor values 33 by means of a bus coupler 34, which thus constitutes a sensor communication interface, on the respective bus line 30*a* or 30*b* to the regulation module 25*a* or 25*b*.

Sensor devices 35*c* and 35*d* arranged on the actuators 18*c* and 18*d* produce further sensor values as actual values 29, f. i. pressure values, force values, temperature values and/or position values 36.

The sensor devices 35*c* and 35*d* are serially coupled with the valve means 23 by way of bus lines 37*a* and 37*b*.

For this purpose the valve means 23 may have separate bus couplers. However it is also possible for the connection contacts for the bus lines 37*a* and 37*b* to be looped through at the valve means 23 to the corresponding connection contacts of the bus coupler 34. In any case the connection of the sensor devices 35*c* and 35*d* and the valve means 23 is simplified if such means are serially coupled together and only one connecting line leads to the regulator communication interfaces 27.

The setting of parameters, and in particular of regulation parameters and/or a selection of type of regulation (bearing regulation, pressure regulation, bearing regulation with slave pressure regulation), and/or a diagnosis of the modules of the valve cluster 11*b*, as for instance of the regulation modules 25*a* and 25*b*, is possible at a central point using an operator device, for example a notebook. The operator device 57 is able to be connected with an operator device interface 58 of the communication means 14*b* and is thus able to be coupled with the internal communication bus 21. Then parameters from the operator device 57 may be saved in the valve cluster 11*b*, for example the regulation modules 25*aa* and 25*ab* or other modules. Furthermore a diagnosis is possible using the operator device 57. Thus for instance the regulation modules 25*a* and 25*b* will transmit failure indications, indications as regards the a number of already performed working cycles or other diagnostics data to the operator device 57.

It will be clear that a wireless operation or diagnosis is also possible, for instance using a operator device 59, which communicates in wireless manner with the communication means 14*b*.

The putting into operation of the automation system 10 and diagnosis and/or parameterizing of the regulation modules 25*a* and 25*b* is simplified by an auto-identification concept. The fluid power devices 17 or their associated means, as for example the sensor devices 35*a*, 35*b* and 35*c*, associated with the actuators 18*a* through 18*c*, contain or form ident data transmission means 60, for sending the device identification data 61*a*, 61*b*, 61*c*, 61*d* and 62 to receiving means 63 for the identification data 61*a* through 61*c* and 62 of the valve clusters 11*a* and 11*b*. The identification data 61*a* through 61*d* characterize the pneumatic actuators 18*a*, 18*b*, 18*c* and 18*d*. The identification data 62 characterize the valve means 23.

The device identification data 62 of the valve means 23 are saved in an optionally present memory 64. In the valve means 23 assigned to the actuator 18*d* it is additionally possible to save device identification data 61*d* to be saved, which characterize the actuator 18*d*. The actuator 18*d* has for example no memory of its own for storage of its identification data and furthermore has no interface to transmit them to the valve cluster 11*b*.

The valve means 23 responsible for fluid control of the actuator 18*c* passes its device identification data 61*c*, which it receives by way of the line 37*b*, on the bus line 30*b* on to the regulator communication interface 27.

The regulator communication interfaces 27 form or contain receiving means 63 for the device identification data 62 and 61*c* and furthermore device identification data 61*d* of the actuator 18*d*. On the basis of these device identification data, which for example comprise working strokes of the actuators 18*c* and 18*d*, the regulator modules 25*a* and 25*b* regulate the actuators 18*c* and 18*d*. In this respect it is possible for the regulation modules 25*a* and 25*b* to directly evaluate the device identification data 61*c*, 61*d* and 62 for the generation of regulation parameters. Accordingly for example a maximum pressure may be limited for the compressed air. Furthermore it is possible for the regulation modules 25*a* and 25*b* to pass on, using the communication infrastructure, namely the internal communication bus 21 and the communication means 14*b*, the respective device identification data 61*b*, 61*d* and 62 to the operator device 57, which generates regulation parameters therefrom and transmits same to the regulation modules 25*a* and 25*b* using the common communication path.

The sensor device 35*a* transmits the device identification data 61*a* in a wireless manner to a receiving means 63 comprised in the valve cluster communication means 14*a*.

The actuator 18b is connected with a conventional compressed air line 86 and a fluid connection line 87, which has a fluid duct 88 and data lines 89, to the valve cluster 11b. The data lines 89 are for example arranged in a casing 90 delimiting the fluid duct 88. On plugging in the fluid connection line 87 contacts (not illustrated in the drawing) of the valve cluster 11b and the sensor device 35b are coupled with the data lines 89 so that simultaneously a fluid connection between the valve cluster 11b and the sensor device 35b and also the actuator 18b is created.

The sensor device 35b transmits the device identification data 61b in a wired manner, f. i. via the data lines 89, to a receiving means 63, which for example is comprised in the valve module 16 in control of the actuator 18b.

For storage and transmission of the device identification data 61a through 61d and 62 various different transmission concepts and storage concepts are possible. In the case of the automation system 10 preferably sensor devices transmit the device identification data 61a, 61b, 61c, 61d and 62 to the receiving means 63.

The valve means 23 comprises the pressure sensors 31 and to this extent constitutes a sensor device. Its bus coupler 34 in this respect constitutes a sensor communication means and the memory 64 with the device identification data 62 and/or 61d constitutes a sensor memory.

The device identification data 61c are not transmitted by the actuator 18c itself but by the sensor device 35c assigned to it. The sensor device 35c is arranged in the housing of the actuator 18c, for example in the longitudinal direction to the side and includes a position sensor 65, which transmits position values 36 of an actuator member 67c of the actuator 18c via a sensor communication interface 68c. The sensor communication interface 68c comprises a bus interface 81, as for example a bus coupler, for a bus connection by way of the valve means 23 to the regulator communication interface 27.

The device identification data 61c characterizing the actuator 18c which for example comprise the diameter of the actuator member 67c, the travel displacement of the actuator member 67c in a housing 69c of the actuator 18c or the like, are saved in a sensor memory 70c. The memory 70c is preferably programmable. for example via a programming interface 71, with which the operator device 57 may be coupled. The sensor communication interface 68c comprises electrical read contacts for instance as a read means 77c for reading the sensor memory 70c.

The actuator 18c need not have any great intelligence of its own for storage of the device identification data 61c.

The sensor device 35c may for example be supplied with electrical power via its sensor communication interface 68c, that is to say a bus coupler.

On the other hand the sensor device 35a, which also includes a position sensor 65, has an electrical long term power storage means 72, as for example a lithium battery, for prolonged operation independent of an external supply of power. Furthermore for data transmission, for example for the transmission of position values produced by a position sensor 65, no line connections are necessary. The sensor device 35a has a wireless communication means 68a, which for example operates using the Wireless Fidelity (Wifi) Standard.

In a sensor memory 70a of the sensor device 35a sensor identification data 73 are save, as for example the resolution of the position sensor 65, an initial position and an end position of the measurement range of the position sensor 65. Device identification data 61a of the fluid power device 17, as for example the diameter of the actuator member 67a, the maximum force available at a force output part (for example its piston rod) of the actuator 67a or the like, are locally saved in a device memory 74 of the fluid power device. The device memory 74 is for example arranged in a cover 75a of the housing 69a and preferably contains a rewritable memory, f. i. an EEPROM. The device memory 74 is programmed during manufacture of the fluid power device 17 so that its device identification data 61a are available at the site of use of the actuator 18a and for example may be read by a reading means, for example using the operator device 59.

It is an advantage to employ a sensor communication interface for the transmission of the device identification data saved in the fluid power device, for example the actuator 18a. A reading means 76a, for example a data interface with electrical contacts of the sensor communication means 68a, reads the device memory 74 via electrical connections 77.

The electrical connections 77 are automatically made while arranging or mounting of the sensor device 35a designed in the form of a sensor module 78. A housing 79 of the sensor device 35a extends as far as the housing cover 75a so that the contacts 80 on the housing cover 75a of the sensor device 35a and of the actuator 18a are in contact and produce the electrical connections 77.

As an alternative a wireless concept is possible, in which the device identification data 61a are for example loaded in a device memory 75' able to be read in a wireless manner, as for example a radio frequency identification (RFID) module. The reading means 76 is in this case a wireless read interface, as for example in a RFID read device. A transmission means of the device memory 74' holds the power necessary for transmission of the device identification data 61a through the sensor device 35a, as for example using an electrical connection (not illustrated) or using the transmission power transmitted on transmission of an interrogation message on the part of the reading means 76.

The device identification data 61a read from the device memories 74 or 74' may also be first device identification data, on the basis of which the sensor device 35a finds second device identification data 61a' in its sensor memory 60a. The identification data 61a' are for example data which complement the identification data 61a. Thus it is possible for example for the device identification data 61a to include a type specification of the actuator 18a, on the basis of which the sensor device 35a finds further characteristic data of the actuator 18a, as for example its mechanical characteristic. Furthermore it is possible in the case of every sensor device in accordance with the invention, as for example in the case of the sensor device 35a, for the sensor device to convert or supplement sensor values on the basis of the device identification data. Thus to take an example the sensor device 35a may provide the position values 36 with additions in metric units, if it has found the actual travel displacement of the actuator 67a on the basis of the device identification data 61a. The sensor device 35b may, on the basis of the pressure sensor values 85 for example specifically find a force output of the actuator 82b and issue it as force values, for example in newtons.

While the sensor devices 35a and 35c constitute sensor modules 73 able to be detachably mounted on the actuators 18 and 18c and are thus able to be replaced by different, sensor device, preferably in accordance with the invention, which for example comprise pressure sensors or the like, a sensor device 35b is an integral component of the actuator 18b.

The sensor device 35b possesses a position sensor 65 and also pressure sensors 84, which for instance are arranged on compressed air ports 83a and 83b. A sensor communication means 68b transmits position values 36 and also pressure sensor values 85 of the pressure sensors 84 in a wired manner. In principle separate data lines could be provide for this purpose. The sensor communication means 68b is however connected with the data lines 89 of the fluid connection line 87.

By way of data lines 89 the sensor device 35b transmits the position sensor values 36 and the pressure sensor values 85 and (for example in the case of an indication to the valve cluster 11b or on interrogation of the valve cluster 11b) the device identification data 61b characterizing the actuator 18b. The device identification data 61b are saved in a sensor memory 70b of the sensor device 35b.

The sensor device 35b furthermore includes a processor 91, which for example counts the duty cycles of the actuator 18b and/or detects failure states on the basis of the pressure sensor values 85 or the like. The processor constitutes a component of diagnosis means 93 and transmits such information as diagnosis data 92 by way of the sensor communication means 68b.

What is claimed is:

1. A valve cluster comprising a plurality of valve modules arranged in a row direction adjacent to each other for the fluid power control of fluid power devices and at least one fluid power device connected with the valve cluster and controlled by the valve cluster, said fluid power device constituting a unit separate from the valve cluster, wherein said valve cluster comprises a receiving means which is assigned to the fluid power device and is designed for receiving device identification data characterizing the at least one fluid power device, said device identification data being transmitted by an ident data transmission means assigned to the fluid power device, the receiving means being, for passing on the device identification data, connected or being able to be connected with a control means for the control of the fluid power device.

2. The valve cluster as set forth in claim 1, wherein the device identification data include a type specification and/or at least one physical property of the fluid power device.

3. The valve cluster as set forth in claim 1, wherein the control means constitutes a component of the valve cluster.

4. The valve cluster as set forth in claim 3, wherein the control means is a control module or a regulation module able to be placed in line with the valve modules.

5. The valve cluster as set forth in claim 3, wherein the receiving means constitutes a component of the control means.

6. The valve cluster as set forth in claim 1, wherein the receiving means constitutes a component of a regulator communication interface for the regulation of the at least one fluid power device.

7. The valve cluster as set forth in claim 1, wherein the receiving means constitutes a component of an input/output module or a valve cluster communication means of the valve cluster.

8. The valve cluster as set forth in claim 1, wherein the control means controls and/or regulates the at least one fluid power on the basis of the device identification data.

9. The valve cluster as set forth in claim 1, wherein the receiving means is coupled with a valve cluster communication means for external communication of the valve cluster.

10. The valve cluster as set forth in claim 1, comprising an internal communication bus for internal communication between the modules of the valve cluster.

11. The valve cluster as set forth in claim 1, wherein the receiving means is adapted for wireless reception of the device identification data.

12. The valve cluster as set forth in claim 1, wherein the receiving means is adapted for a concatenated connection arrangement, in which a first ident data transmission means of a first fluid power device and at least one second ident data transmission means of a second fluid power device are coupled for the transmission of device identification data characterizing the respective fluid power device serially with the receiving means.

13. The valve cluster as set forth in claim 1, wherein the receiving means comprises a bus interface.

14. The valve cluster as set forth in claim 1, wherein the ident data transmission device constitutes a component of the fluid power device or is a unit separate from the fluid power device.

15. The valve cluster as set forth in claim 1, wherein the at least one fluid power device includes a valve means remote from the valve cluster for fluid power control of a fluid power actuator.

16. The valve cluster as set forth in claim 1, wherein the fluid power actuator or a sensor device assigned to the actuator or an ident module for the transmission of actuator identification data characterizing the actuator is coupled in series by way of the valve means.

17. The valve cluster as set forth in claim 1, wherein the receiving means is connected with a connection for a fluid connection line, by way of which the ident data transmission means is able to be coupled with the valve cluster, the fluid power connection line comprising at least one data line, via which the ident data transmission means transmits the device identification data.

* * * * *